United States Patent
Klaser

(10) Patent No.: US 10,544,842 B2
(45) Date of Patent: Jan. 28, 2020

(54) ONE-WAY CLUTCH FOR A VEHICLE

(71) Applicant: FORD GLOBAL TECHNOLOGIES, LLC, Dearborn, MI (US)

(72) Inventor: Jacob Klaser, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 228 days.

(21) Appl. No.: 15/468,497

(22) Filed: Mar. 24, 2017

(65) Prior Publication Data

US 2018/0274606 A1 Sep. 27, 2018

(51) Int. Cl.
*F16D 27/00* (2006.01)
*F16D 41/12* (2006.01)
*F16D 27/102* (2006.01)

(52) U.S. Cl.
CPC ........... *F16D 41/12* (2013.01); *F16D 27/004* (2013.01); *F16D 27/102* (2013.01)

(58) Field of Classification Search
CPC ........ F16D 41/12; F16D 41/14; F16D 27/004; F16D 27/102; F16D 27/09
See application file for complete search history.

(56) References Cited

U.S. PATENT DOCUMENTS

| | | | |
|---|---|---|---|
| 5,897,098 A | 4/1999 | Nishinosono et al. | |
| 7,584,727 B2 | 9/2009 | Liang et al. | |
| 9,109,636 B2* | 8/2015 | Kimes | F16D 27/02 |
| 9,562,574 B2* | 2/2017 | Kimes | F16D 27/14 |
| 10,066,679 B2* | 9/2018 | Cioc | F16D 41/14 |
| 2013/0062544 A1 | 3/2013 | Cheong et al. | |
| 2014/0305761 A1* | 10/2014 | Kimes | F16D 27/09 |
| | | | 192/46 |
| 2015/0204391 A1* | 7/2015 | Kimes | F16D 27/09 |
| | | | 192/84.8 |
| 2016/0160941 A1 | 6/2016 | Green et al. | |
| 2017/0204917 A1* | 7/2017 | Bird | F16D 27/09 |
| 2017/0254370 A1* | 9/2017 | Peglowski | F16D 23/12 |
| 2018/0057518 A1* | 3/2018 | Bovin | C07H 15/10 |

* cited by examiner

*Primary Examiner* — David J Hlavka
(74) *Attorney, Agent, or Firm* — David B. Kelley; Brooks Kushman P.C.

(57) ABSTRACT

A one-way clutch includes a first clutch member, a second clutch member disposed coaxially with the first clutch member for rotation relative to the first clutch member, and an electromagnetic actuator assembly. The assembly is supported on one of the clutch members and configured to engage the other of the clutch members. The assembly includes a core, a coil disposed therearound, and a magnetic armature having an aperture therethrough. The armature is pivotable toward a longitudinal end of the core by energization of the coil from a de-energized position to an energized position such that the end of the core resides in the aperture in at least one of the positions.

10 Claims, 3 Drawing Sheets

US 10,544,842 B2

ONE-WAY CLUTCH FOR A VEHICLE

TECHNICAL FIELD

The present disclosure relates to one-way clutches for motor vehicles.

BACKGROUND

Motor vehicles may include transmissions with one-way clutches. One-way clutches may permit rotation of the clutch member(s) in both directions and may also include an actuator assembly. The actuator assembly may engage with one of the clutch members of the one-way clutch to lock the clutch member and prevent it from rotating in at least one rotational direction. The actuator assembly may be electromechanically actuated by energization of a coil which creates magnetic flux in and around a core. Magnetically permeable contaminants may collect on the core and prevent free movement of an armature of the actuator assembly. As such, it may be desirable to ensure free movement of the armature uninhibited by nearby contaminants.

SUMMARY

According to an embodiment, a one-way clutch includes a first clutch member, a second clutch member disposed coaxially with the first clutch member for rotation relative to the first clutch member, and an electromagnetic actuator assembly. The assembly is supported on one of the clutch members and configured to engage the other of the clutch members. The assembly includes a core, a coil disposed therearound, and a magnetic armature having an aperture therethrough. The armature is pivotable toward a longitudinal end of the core by energization of the coil from a de-energized position to an energized position such that the end of the core resides in the aperture in at least one of the positions.

According to another embodiment, an actuator assembly for a one-way clutch includes a core and a coil disposed around the coil. The core has an end surface disposed outside the coil. The actuator assembly further includes a magnetic armature having longitudinal ends disposed on opposite sides of the core. The armature is moveable between de-energized and energized positions by energization of the coil and has a cavity disposed over the end surface of the core to prevent armature contact with contaminants on the core.

According to another embodiment, an electromagnetic actuator assembly for a one-way clutch includes a core and a coil disposed around the core. The core has a longitudinal end outside the coil. The electromagnetic actuator assembly further includes a magnetic armature disposed over the core and extending in a direction generally perpendicular thereto. The armature is moveable by energization of the coil and has an aperture aligned with the core for receiving the end of the core.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
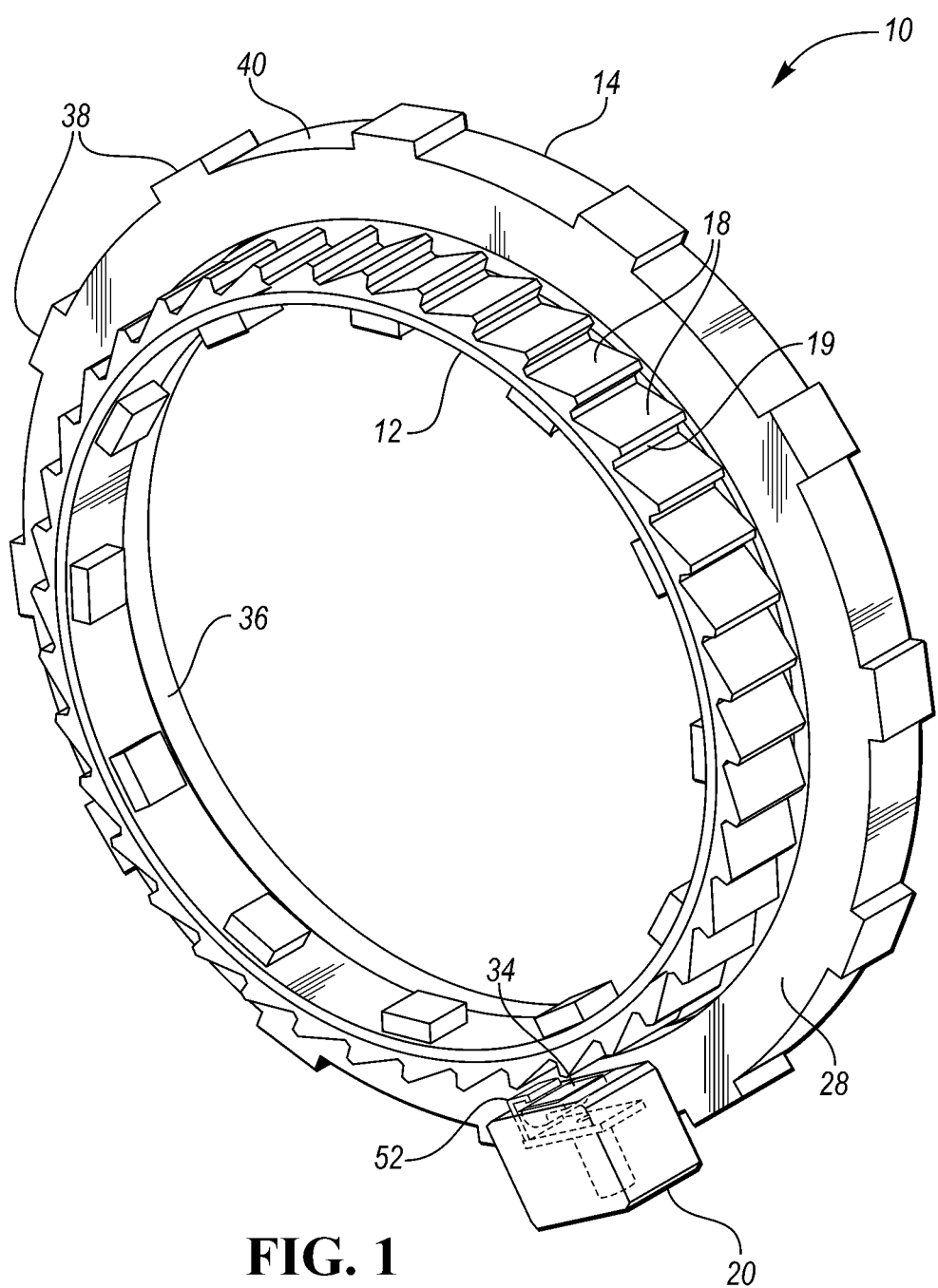
FIG. 1 is a perspective view of a one-way clutch of a vehicle.

FIG. 1 is a perspective view of a one-way clutch 10 of a vehicle. The clutch 10 may be used to transmit torque. The clutch 10 may include clutch members 12, 14. At least one of the clutch members 12, 14 may be configured for rotation about a central axis 16 by selective actuation of an actuation assembly 20 of the clutch 10. In one embodiment, the clutch member 12 rotates relative to the clutch member 14, which is fixed. The clutch members 12, 14 are generally circular and disposed coaxially relative to the axis. The clutch member 14 is offset from the clutch member 12 in an axial direction.

The clutch member 12 includes a plurality of teeth 18 on an outer perimeter surface 19 of the clutch member 12 for engagement with the actuator assembly 20 of the clutch 10. The teeth 18 may ramp upwards in a rotational direction 22. The clutch member 12 may have a plurality of projections 24 on an inner perimeter surface 26 of the clutch member 12 for engagement and/or splining with another component of the vehicle.

The clutch member 14 supports the actuator assembly 20 such that the actuator assembly 20 is fixed relative to the clutch member 14. The actuator assembly 20 is disposed on a radially-extending end surface 28 of the clutch member 14 facing the clutch member 12. The diameters of the clutch members 12, 14 are sized such that the actuator assembly 20 may engage with the teeth 18 of the clutch member 12. In the illustrated embodiment, an inner diameter of the clutch member 14 is greater than an outer diameter of the clutch member 12 to accommodate movement of a nonmagnetic rocker 54 of the actuator assembly 20 therebetween. One of ordinary skill in the art will understand that other configurations may be utilized within the spirit and scope of the instant disclosure. For example and without limitation, the actuator assembly 20 may be disposed on an inner perimeter surface 36 of the clutch member 14, and the clutch member 12 may be disposed within clutch member 14 such that the teeth 18 are radially aligned with the inner perimeter surface 36. The clutch member 14 may include a plurality of protrusions 38 on an outer perimeter surface 40 of the clutch member 14 for engagement and/or splining with another component of the vehicle. The clutch members 12, 14 may comprise metal, such as steel or aluminum.

Figure 2:
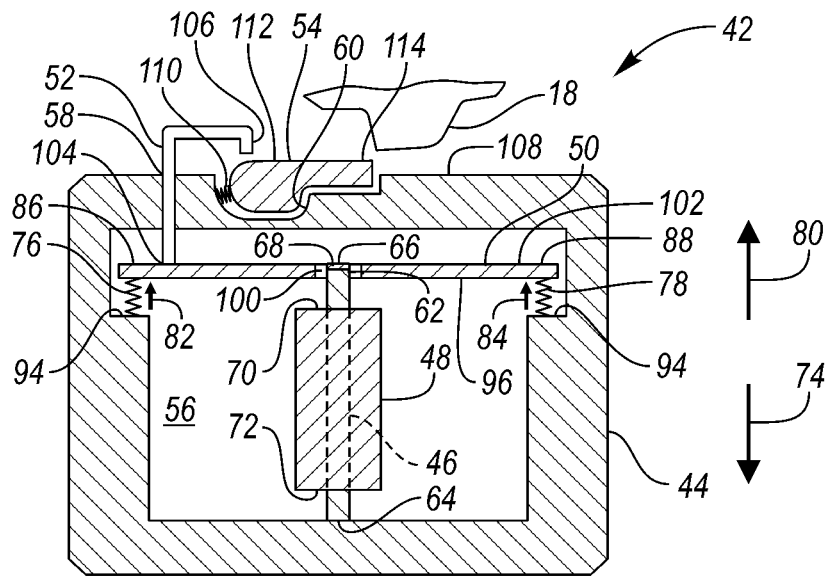
FIG. 2 is a cross-sectional view of an actuator assembly of the one-way clutch of FIG. 1 in an unlocked position in accordance with an embodiment of the instant disclosure.
Figure 3:
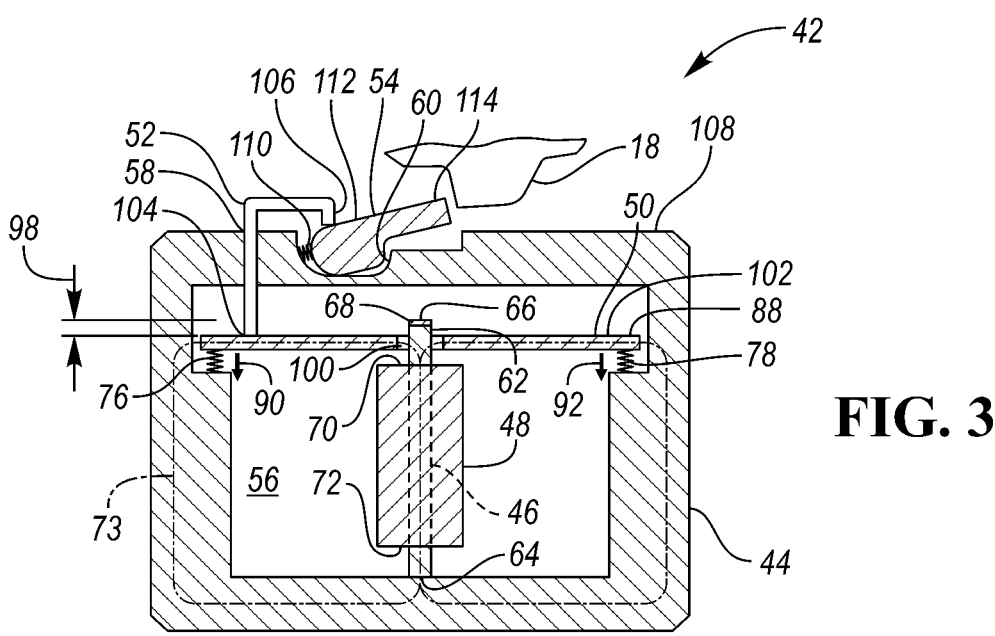
FIG. 3 is a cross-sectional view of the actuator assembly of FIG. 2 in a locked position.

FIG. 2 is a cross-sectional view of an actuator assembly 42 of the one-way clutch 10 of FIG. 1 in an unlocked position in accordance with an embodiment of the instant disclosure. FIG. 3 is a cross-sectional view of the actuator assembly 42 of FIG. 2 in a locked position. The actuator assembly 42 may be the actuator assembly 20 of FIG. 1. The actuator assembly 42 may be an electromechanical actuator assembly and include a housing 44, a core 46, a coil 48 disposed around the core 46, a magnetic armature 50, a nonmagnetic link 52, and nonmagnetic rocker 54. A controller of the vehicle may effect a voltage and/or current to be applied to the coil 48 such that an electromagnetic filed is created around the core 46. The generated magnetic flux attracts the magnetic armature 50 toward the coil 48. Movement of the armature 50 toward the coil 48 causes movement of the nonmagnetic link 52, and movement of the nonmagnetic link 52 causes movement of the rocker 54.

The housing 44 of the assembly 42 is affixed to the clutch member 14. The housing 44 may have a generally square cross-section and may have a cavity 56 for containing the core 46, coil 48, and armature 50. The housing 44 may also have an aperture 58 through which the nonmagnetic link 52 extends. The housing 44 may have a recess 60 for receiving the rocker 54. The housing 44 may comprise a permeable steel in some embodiments. One of ordinary skill in the art will understand that the housing 44 may take on a variety of shapes and sizes within the spirit and scope of the instant disclosure.

In the illustrated embodiment, the core 46 has a generally cylindrical shape and has two longitudinal ends 62, 64 disposed outside the coil 48. The longitudinal end 62 may have a radially-extending end surface 66. The core 46 is oriented in a direction that is perpendicular to the central axis 16 defined by the clutch members 12, 14 (FIG. 1). In one embodiment, the core 46 is supported by a plastic bobbin disposed between the coil 48 and core 46 and secured to the housing 44. The core 46 may comprise a material with high permeability, such as steel.

In one embodiment, the core 46 has an epoxy layer 68 disposed on the end surface 66. The epoxy layer 68 may serve as a magnetic air gap between the core 46 and the contaminants. The epoxy layer 68 may comprise a silicon-based or plastic material.

In the illustrated embodiment, the coil 48 is would around a portion of the core 46 and has longitudinal ends 70, 72. Voltage and/or current may be applied to the coil 48 to create a magnetic field 73. The generated magnetic flux may be most concentrated or greatest at the longitudinal end 62 of the core 46, particularly, at the radially-extending end surface 66. The coil 48 may comprise copper in one embodiment.

The core 46 and coil 48 serve to create a magnetic field strong enough to attract the armature 50 in a downward direction 74 toward the coil 48 and longitudinal end 64 of the core 46. As such, selective energization of the coil 48 causes the armature 50 to move in the downward direction 74.

As shown in FIG. 2, the assembly 42 may further include biasing members 76, 78. The biasing members 76, 78 may be preformed to bias the armature 50 in an upward direction 80 to a home or "de-energized" position. The biasing members 76, 78 apply a biasing force 82, 84 to each longitudinal end 86, 88 of the armature 50. When the coil 48 is energized, the generated magnetic field causes the armature 50 to move in the downward direction 74 to an energized position (FIG. 3). Such movement causes an armature force 90, 92 applied by the armature 50 on the biasing members 76, 78 to overcome the biasing forces 82, 84. The biasing members 76, 78 may be springs and may each have one longitudinal end coupled to a lip 94 of the housing 44 and another longitudinal end coupled to an underside 96 of the armature 50. In one embodiment, the biasing members 76, 78 have the same stiffness (e.g., the same spring constant, k) such that energization of the coil 48 causes both longitudinal ends 86, 88 of the armature 50 to move the same distance 98. In another embodiment, the biasing members 76, 78 may have different stiffnesses such that the longitudinal ends 86, 88 of the armature 50 move different distances upon energization of the coil 48. In such an embodiment, the armature 50 may be designed to pivot about one of its longitudinal ends 86, 88. The biasing members 76, 78 may comprise steel or aluminum in some embodiments. Although the biasing members 76, 78 are illustrated as springs, one of ordinary skill in the art will understand that there are other ways to cause biasing. For example and without limitation, the biasing members 76, 78 may be permanent magnets.

Figure 4:
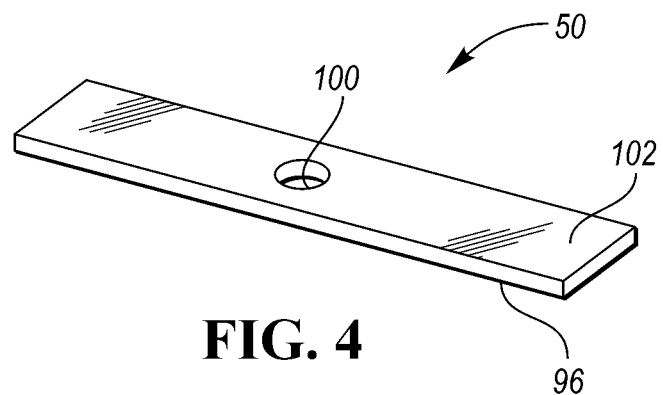
FIG. 4 is a perspective view of an armature of the actuator assembly of FIGS. 2-3.

FIG. 4 is a perspective view of the armature 50 of the actuator assembly 42 of FIGS. 2-3. As illustrated, the armature 50 may be flat and rectangular in cross section. The armature 50 comprises a magnetic material such that energization of the coil 48 causes the armature 50 to be attracted toward the longitudinal end 64 of the core 46, thus, causing movement of the armature 50 in the downward direction 74. The armature 50 may be disposed over the core 46 and extend in a direction generally perpendicular thereto. The longitudinal ends 86, 88 of the armature 50 may be disposed on opposite sides of the core 46. The armature 50 may have an aperture or cavity 100 aligned with the core 46 for receiving the longitudinal end 62 of the core 46 in at least one of the de-energized and energized positions. In one embodiment, the aperture 100 may extend from a topside 102 of the armature 50 to the underside 96 of the armature 50 opposite the topside 102 and adjacent the longitudinal end 62 of the core 46. In another embodiment, the aperture or cavity 100 does not extend all the way through the armature 50 and, instead, extends from the underside 96 to a height below the topside 102 of the armature 50.

In the illustrated embodiment, the aperture 100 extends all the way through the armature 50 from the underside 96 to the topside 102 and receives the longitudinal end 62 of the core 46 in the de-energized and energized positions. In the de-energized position, the radially-extending end surface 66 of the core 46 is disposed within the aperture 100. In the energized position, the radially-extending end surface 66 is disposed outside of and above the aperture 100.

Because the magnetic flux may be greatest at the radially-extending end surface 66 of the core 46, magnetically permeable contaminants found in the transmission fluid are also attracted to the radially-extending end surface 66 of the core 46 when the coil 48 is energized. When the coil 48 is de-energized, there may be remnant magnetism that keeps the contaminants disposed on the end surface 66 of the core 46. The remnant magnetism may not be strong enough to attract and move the armature 50, but may be strong enough to retain the contaminants on the end surface 66. In some designs, it may not be possible or ideal to reverse the flow of current to De-Gauss this remnant magnetism, stemming from the characteristics of the material's B-H Curve. As such, it may be desirable to position the end surface 66 of the core 46 in such a manner that the contaminants present (due to remnant magnetism) do not interfere with movement of the armature 50 upon re-energization of the coil 48 at a later time. The illustrated embodiment of FIGS. 2-3 shows a configuration in which the armature 50 has an aperture 100 through which the longitudinal end 62 of the core 46 is disposed (in both positions). As such, the end surface 66 of the core 46 is disposed within or above the aperture 100 so that any contaminants present due to remnant magnetism do not interfere with free movement of the armature 50 upon energization of the coil 48. One of ordinary skill in the art will understand that other configurations are possible. For example and without limitation, the end surface 66 of the core 46 may be disposed outside the aperture 100 (below the armature 50) in at least one of the positions. Furthermore, the end surface 66 may be disposed above the armature 50 in both of the positions. Lastly and as discussed above, the aperture 100 may not be a thru-hole but, instead, be a cavity formed in the underside 96 of the armature 50 such that the end surface 66 of the core 46 (along with any contaminants present thereon) will not contact or interference with the armature 50 as it moves upon energization of the coil 48. In such embodiments, the aperture or cavity 100 is designed to maintain a gap between the core 46 and armature 50 and to prevent armature contact with contaminants on the core 46.

As further shown in FIGS. 2-3, the nonmagnetic link 52 of the assembly 42 is coupled to the armature 50 such that movement of the armature 50 causes movement of the link 52. The link 52 is generally shaped like a hook. An end 104 of the link 52 is coupled to the armature 50 adjacent longitudinal end 86 of the armature 50. The link 52 extends in the upward direction 80 from the armature 50 and through aperture 58 of the housing 44 and hooks toward the rocker 54 for engagement therewith. The link 52 has another end 106 opposite the end 104 that contacts the rocker 54 upon energization of the coil 48. Movement of the armature 50 in the downward direction 74 (upon energization of the coil 48) causes movement of the end 106 of the link 52 in the downward direction 74 as well. The end 106 of the link 52 projects slightly downwards from a horizontal section of the link 52 in the illustrated embodiment. The link 52 may comprise metal in some embodiments.

With continued reference to FIGS. 2-3, the rocker 54 of the assembly 42 is adapted to engage with the clutch member 12 of the one-way clutch 10 upon energization of the coil 48. The rocker 54 is coupled to an outer surface 108 of the housing 44 and is disposed within the recess 60 of the housing 44. In one embodiment, the rocker 54 is held within the recess 60 by retainers that protrude inwardly from sides of the recess 60 near the biasing member 110. A biasing member 110 applies a biasing force to the rocker 54 and thus biases the rocker 54 to an unlocked position (FIG. 2). Energization of the coil 48 causes the armature 50 and end 106 of the link 52 to move in the downward direction 74. Movement of the end 106 of the link 52 in the downward direction 74 causes the end 106 to contact and rotate a hinge end 112 of the rocker 54. Rotation of the rocker 54 at hinge end 112 overcomes the biasing force of the biasing member 110 and causes movement of a pivot end 114 of the rocker 54 opposite the hinge end 112. As illustrated, the rocker 54 may have a cylindrically shaped hinge end 112 with a flat portion 116 extending therefrom. The pivot end 114 is disposed at the end of the flat portion 116 opposite the hinge end 112. Furthermore, the recess 60 of the housing 44 may be shaped to accommodate the shape of the rocker 54 such that in the de-energized position, the rocker 54 lies flush with or below the outer surface 108 of the housing 44 adjacent the clutch member 12. The rocker 54 may comprise steel in some embodiments. Although the illustrated embodiment shows the armature 50 engaging the link 52, and the link 52 engaging the rocker 54, one of ordinary skill in the art will understand that more or less elements may be utilized to cause engagement with the clutch member 12. For example and without limitation, the armature 50 may be connected directly with the rocker 54 without use of the link 52.

As shown in FIG. 3, upon energization of the coil 48, the rocker 54 is moved (by the link 52) such that the pivot end 114 of the rocker 54 engages with a tooth 18 of the clutch member 12. Such engagement may cause the clutch member 12 to either stop (if clutch member 14 is fixed) or to rotate with the clutch member 14 (if clutch member 14 is configured for rotation).

Figure 5:
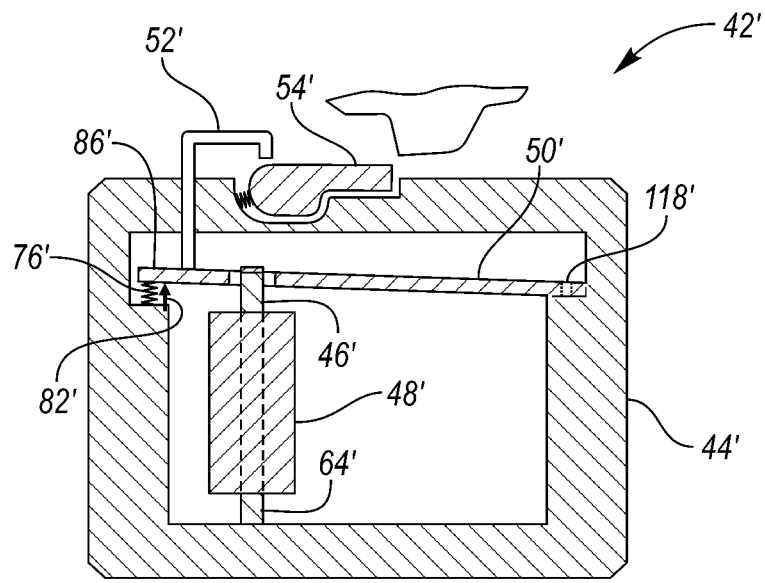
FIG. 5 is a cross-sectional view of an actuator assembly of the one-way clutch of FIG. 1 in an unlocked position in accordance with another embodiment of the instant disclosure.
Figure 6:
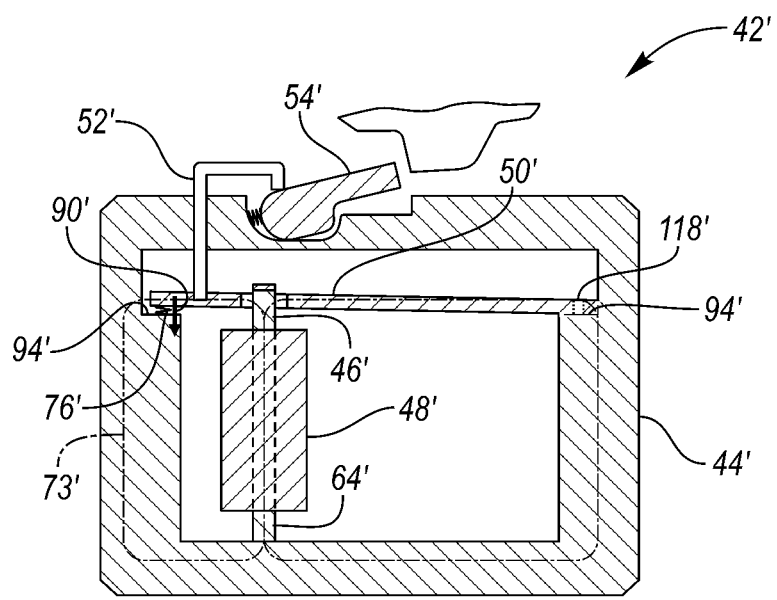
FIG. 6 is a cross-sectional view of the actuator assembly of FIG. 5 in a locked position.

FIG. 5 is a cross-sectional view of an actuator assembly 42' of the one-way clutch 10 of FIG. 1 in an unlocked position in accordance with another embodiment of the instant disclosure. FIG. 6 is a cross-sectional view of the actuator assembly 42' of FIG. 5 in a locked position. The actuator assembly 42' may be the actuator assembly 20 of FIG. 1. The illustrated embodiment of FIGS. 5-6 is similar to the illustrated embodiment of FIGS. 2-3 except that the armature 50' in FIGS. 5-6 is adapted to pivot relative to a pivot point 118', rather than moving up and down in a generally linear direction as with the embodiment of FIGS. 2-3. The pivot point 118' may be offset from the aperture or cavity 100' of the armature 50'. In addition, the core 46' and coil 48' are positioned toward the longitudinal end 86' of the armature 50', which is the pivoting end that causes movement of the link 52' and of the rocker 54'.

In the illustrated embodiment of FIGS. 5-6, the longitudinal end 88' of the armature 50' is fixed to the lip 94' of the housing 44'. The biasing member 76' applies a biasing force 82' to the longitudinal end 86' of the armature 50' to bias the longitudinal end 86' to the de-energized position. Upon energization of the coil 48', the armature 50' is attracted toward the longitudinal end 64' of the core 46', thus causing the longitudinal end 86' of the armature 50' to move downward and apply an armature force 90' onto the biasing member 76'. The armature force 90' overcomes the biasing force 82', and therefore the longitudinal end 86' of the armature 50' moves downward toward the longitudinal end 64' of the core 46', which causes movement of the link 52' and rocker 54' as described above.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Furthermore, details disclosed in connection with one embodiment apply to other disclosed embodiments as well, unless specified otherwise. Moreover, the terms "horizontal" and "vertical" used within the disclosure are used to describe the positioning of the elements relative to one another and may not indicate absolute horizontal or vertical directions.

What is claimed is:

1. A one-way clutch comprising:
   a first clutch member;
   a second clutch member disposed coaxially with the first clutch member for rotation relative to the first clutch member; and
   an electromagnetic actuator assembly supported on one of the clutch members and configured to engage the other of the clutch members, the assembly including a core, a coil disposed therearound, and a magnetic armature having an aperture therethrough, wherein the armature is pivotable toward a longitudinal end of the core by energization of the coil from a de-energized position to an energized position such that the end of the core resides in the aperture in at least one of the positions, wherein the aperture of the magnetic armature extends from a topside of the armature to an underside of the armature opposite the topside and adjacent the longitudinal end of the core.

2. The one-way clutch of claim 1, wherein the longitudinal end of the core is disposed outside the coil.

3. The one-way clutch of claim 1, wherein the magnetic armature is pivotable about a pivot point that is offset from the aperture of the armature.

4. The one-way clutch of claim 3, wherein the electromagnetic actuator assembly further includes a nonmagnetic rocker adapted to engage with teeth of one of the first and second clutch members, wherein the rocker is coupled to an end of the magnetic armature opposite the pivot point, and wherein pivoting of the armature causes pivoting of the rocker.

5. An electromagnetic actuator assembly for a one-way clutch, comprising:
   a core;
   a coil disposed around the core, the core having a longitudinal end outside the coil; and
   a magnetic armature disposed over the core and extending in a direction generally perpendicular thereto, the armature being moveable by energization of the coil and having an aperture aligned with the core for receiving the end of the core, wherein the core has an epoxy layer disposed on a radially-extending surface of the longitudinal end, and wherein the epoxy layer comprises a silicon-based or plastic material.

6. The electromagnetic actuator assembly of claim 5, further comprising biasing members that apply biasing forces to longitudinal ends of the magnetic armature such that the armature is biased to a de-energized position, and wherein upon energization of the coil, the armature applies armature forces to the biasing members to overcome the biasing forces and cause movement of the armature to an energized position.

7. The electromagnetic actuator assembly of claim 5, wherein the magnetic armature is moveable between de-energized and energized positions by energization of the coil, and wherein a radially-extending end surface of the longitudinal end of the core is disposed outside the aperture of the armature in at least one of the positions.

8. The electromagnetic actuator assembly of claim 5, wherein the aperture of the magnetic armature extends from a topside of the armature to an underside of the armature opposite the topside and adjacent the coil.

9. An electromagnetic actuator assembly for a one-way clutch, comprising:
   a core;
   a coil disposed around the core, the core having a longitudinal end outside the coil; and
   a magnetic armature disposed over the core and extending in a direction generally perpendicular thereto, the armature being moveable by energization of the coil and having an aperture aligned with the core for receiving the end of the core, wherein the core has an epoxy layer disposed on a radially-extending surface of the longitudinal end, and wherein the epoxy layer comprises a silicon-based or plastic material, wherein the magnetic armature is pivotable about a pivot point such that an end of the armature opposite the pivot point moves upon energization of the coil, and the aperture is disposed between the end of the armature and the pivot point.

10. The electromagnetic actuator assembly of claim 9, further comprising a nonmagnetic rocker adapted to engage with a clutch member of the one-way clutch and a nonmagnetic link coupled to the rocker and end of the armature opposite the pivot point, wherein pivoting of the armature causes movement of the link, and movement of the link causes pivoting of the rocker.

* * * * *